(12) United States Patent
Kim (10) Patent No.: US 7,913,174 B2
(45) Date of Patent: Mar. 22, 2011

(54) METHOD AND APPARATUS FOR DISPLAYING A USER INTERFACE IN AN IMAGE FORMING APPARATUS

(75) Inventor: Kee-taek Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 11/701,387

(22) Filed: Feb. 2, 2007

(65) Prior Publication Data

US 2007/0198936 A1    Aug. 23, 2007

(30) Foreign Application Priority Data

Feb. 20, 2006    (KR) .................. 10-2006-0016225

(51) Int. Cl.
*G06F 15/00* (2006.01)
*G06F 13/00* (2006.01)
(52) U.S. Cl. ...................... 715/746; 715/744
(58) Field of Classification Search .......... 715/763–765, 715/853–855, 746, 700, 715, 744, 851
See application file for complete search history.

(56) References Cited

U.S. PATENT DOCUMENTS

| 5,818,446 | A | 10/1998 | Bertram et al. |
| 7,564,584 | B2* | 7/2009 | Takahashi et al. .............. 358/2.1 |
| 2004/0085572 | A1* | 5/2004 | Gomez ........................ 358/1.15 |
| 2005/0206913 | A1* | 9/2005 | Matsuda et al. ................ 358/1.1 |
| 2007/0159663 | A1* | 7/2007 | Tsujimoto ..................... 358/448 |
| 2007/0255428 | A1* | 11/2007 | Nagata .............................. 700/8 |

FOREIGN PATENT DOCUMENTS

KR    10-2005-0043262    5/2005

* cited by examiner

*Primary Examiner* — Cao "Kevin" Nguyen
(74) *Attorney, Agent, or Firm* — Roylance, Abrams, Berdo & Goodman, L.L.P.

(57) ABSTRACT

An image forming apparatus having a display function and a method of displaying a user interface display are provided. The method includes searching for interface information corresponding to screen layout information from a stored interface information, and displaying a plurality of user interfaces indicated by the found interface information. The displayed plurality of user interfaces are included in one or more layers and indicate one or more functions among multiple data processing functions that can be performed by the image forming apparatus.

23 Claims, 5 Drawing Sheets

METHOD AND APPARATUS FOR DISPLAYING A USER INTERFACE IN AN IMAGE FORMING APPARATUS

CROSS-REFERENCE TO RELATED PATENT APPLICATION

This application claims the benefit under 35 U.S.C. §119 (a) of Korean Patent Application No. 10-2006-0016225, filed on Feb. 20, 2006, in the Korean Intellectual Property Office, the entire disclosure of which is hereby incorporated by reference.

BACKGROUND OF THE INVENTION

1. Field of the Invention

The present invention relates to an image forming apparatus such as a multi function printer (MFP). More particularly, to an image forming apparatus having multiple data processing functions (such as printing, copying, faxing, and scanning) and a display function, and a method of displaying a user interface therefor.

2. Description of the Related Art

Recently, multi function printers (MFP) that perform various functions such as printing, copying, and faxing have used a display unit (not shown) such as a liquid crystal display (LCD) as a display for the various functions of the printer.

In an MFP, various user interfaces may be displayed on the display unit. Examples of user interfaces include a user interface for configuring printing-related functions, a user interface for configuring faxing-related functions, and user interface for configuring scanning-related functions.

In a conventional method of displaying a user interface, only a single user interface is displayed on the display unit. Accordingly, if a user is not interested in a user interface currently displayed on the display unit, the user has to perform a number of key operations until a desired user interface is displayed on the display unit (not shown). Performing the key operations is inconvenient.

For example, if a user desires to view the user interface for configuring a faxing-related function to modify the configuration of the faxing-related function of the MFP in a state where a printing-related function user interface is currently displayed on the display unit, the user must perform an inconvenient number of key operations until the desired user interface for configuring faxing-related functions appears.

Accordingly, there is a need for an improved method of displaying a user interface in an MFP, and an MFP that performs the improved method.

SUMMARY OF THE INVENTION

An aspect of the present invention is to address at least the above problems and/or disadvantages and to provide at least the advantages described below. Accordingly, an aspect of the present invention is to provide a method of displaying a user interface in an image forming apparatus that has multiple data processing functions and a display function can display on a single screen a plurality of user interfaces which indicate one or more data processing functions and are included in one or more layers.

Another aspect of the present invention is to provide an image forming apparatus that performs the method of displaying a user interface.

Another aspect of the present invention is to provide a computer-readable medium having embodied thereon a computer program for executing the method of displaying a user interface.

In accordance with an aspect of the present invention, a method of displaying a user interface on a display unit of an image forming apparatus is provided. The method includes the steps of (a) displaying a plurality of user interfaces on the display unit, (b) selecting one user interface from the plurality of user interfaces, and (c) configuring one or more functions displayed on the selected user interface.

The method may also include the step of performing the configured function.

The method may also include the step of enlarging and displaying the selected user interface.

In accordance with another aspect of the present invention, at least one of the plurality of user interfaces in step (a) is in a first layer and comprises user options, each user option having a corresponding user interface for display in a different layer wherever that user option is selected.

The steps (b) and (c) may be performed whenever a layer of a user interface displayed in step (a) is modified.

In accordance with another aspect of the present invention, the plurality of user interfaces correspond to main screens in an uppermost layer of respective functions in the image forming apparatus. At least one of the main screens comprises user options, each user option having a corresponding user interface for display in a different layer wherever that user option is selected.

When a function displayed on a user interface included in the lowermost layer is configured, the configured function may be performed.

The number of user interfaces displayed together in step (a) may be variable.

In step (a), if all of the plurality of user interfaces are not displayed on a single screen, the user interface displayed on the single screen may be changed through a key operation for a user to observe all of the plurality of user interfaces.

The selected user interface may be displayed in a visually distinctive manner with respect to other, unselected user interfaces.

The display unit may be an operation panel of an image forming apparatus.

The plurality of user interfaces may be displayed on a first region of the display unit, and the selected user interface may be displayed on a second region of the display unit.

The one or more functions may comprise one or more functions selected from the group comprising a printing function, a copying function, a faxing function, a scanning function, and a data sending/receiving function.

The image forming apparatus may comprise an interface information storage unit that stores interface information regarding each user interface that can be displayed by the image forming apparatus, a searching unit that searches for interface information corresponding to screen layout information from the stored interface information, and a user interface unit that displays the plurality of user interfaces indicated by the interface information found by the searching unit.

In accordance with another aspect of the present invention, a computer-readable medium having embodied thereon a computer program for executing a method of displaying a user interface in an image forming apparatus capable of displaying user interfaces on a display unit is provided. The method includes the steps of (a) displaying a plurality of user interfaces on the display unit, (b) selecting one user interface from the plurality of user interfaces, and (c) configuring one or more functions displayed on the selected user interface.

In accordance with another aspect of the present invention, a method of displaying a user interface on a display unit is provided. The method includes the steps of (a) simultaneously displaying a plurality of user interfaces on a display unit, (b) receiving a selection of one user interface from the plurality of user interfaces, (c) displaying the selected one user interface in a visually distinctive manner, and (d) receiving configuration information for functions displayed on the selected one user interface.

The step of displaying the selected one user interface in a visually distinctive manner may comprise displaying the selected user interface in an enlarged state.

The number of user interfaces displayed simultaneously in step (a) may be variable.

The method may further include the step of receiving an input from a user to observe additional user interfaces that are not displayed on the display unit.

The plurality of user interfaces may be displayed on a first region of the display unit, and the selected user interface may be displayed on a second region of the display unit.

In accordance with another aspect of the present invention, an image forming apparatus comprises an interface information storage unit for storing interface information regarding user interfaces that can be displayed by the image forming apparatus, a screen layout information storage unit for storing screen layout information, a searching unit for searching for interface information corresponding to screen layout information, and a user interface unit for displaying a plurality of user interfaces based on interface information found by the searching unit. The plurality of user interfaces are displayed simultaneously.

The user interface unit may comprise an LCD touch-screen for receiving selection information for selecting one user interface from among the plurality of displayed user interfaces.

The user interface unit may display the selected one user interface in a visually distinctive manner.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
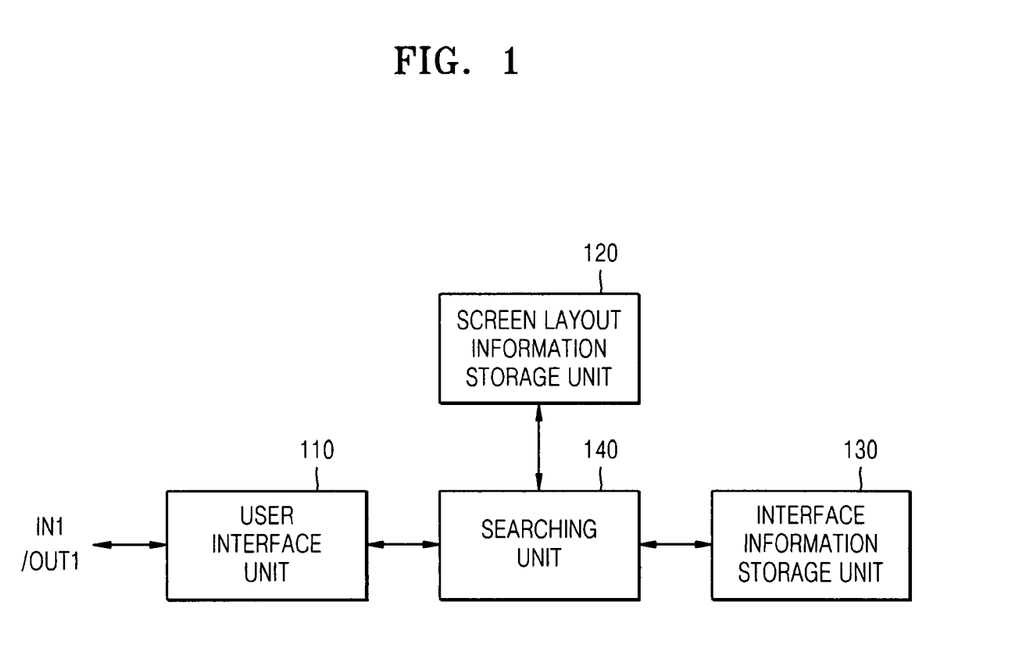
FIG. 1 is a block diagram of an image forming apparatus that performs a method of displaying a user interface, according to an exemplary embodiment of the present invention.

FIG. 1 is a block diagram of an image forming apparatus that performs a method of displaying a user interface, according to an exemplary embodiment of the present invention. The image forming apparatus includes a user interface unit 10, a screen layout information storage unit 120, an interface information storage unit 130, and a searching unit 140.

Like a multi function printer (MFP), the image forming apparatus can perform multiple data processing functions. These functions may be include functions such as copying, faxing, sending data, receiving data, and scanning.

Preferably, the image forming apparatus includes a display unit (not shown) such as a liquid crystal display (LCD), for displaying a user interface.

The user interface unit 110 can function as a display unit, and thus displays the user interface. Preferably, the displayed user interface is a user interface for configuring data processing related functions such as copying, faxing, sending data, receiving data, and scanning. The displayed user interface may be a user interface for configuring printing-related functions, a user interface for configuring faxing-related functions, or a user interface for configuring scanning-related functions. The displayed user interface is indicated by OUT1.

The user interface unit 110 may display a single user interface or a plurality of user interfaces on a single screen.

When a plurality of user interfaces are displayed on the single screen, the user interfaces are included in one or more layers. The layers, for example, can be functional screen layers or display screen layers. Illustrative functional screen layers include, but are not limited to, having a main screen for a selected function of the image forming apparatus, and the main screen having a plurality of options. The selection of one of these options can result in the display of one or more other screens corresponding to the respective options in another screen display layer (e.g., a layer sequentially displayed after a layer comprising the main screen is displayed an modified, or a layer overlaid at least partially over the layer comprising the main screen). Illustrative display screen layers can include, but are not limited to, a single screen used to display multiple user interfaces (e.g., the main screens of several image forming apparatus functions, or the user interfaces that are most frequently used by the users of the image forming apparatus). If these multiple user interfaces do not fit one a single display, they can be divided among several, sequentially displayed and navigable layers of related screens, each of which can have a two or more of user interfaces in accordance with the present invention.

Thus, all user interfaces that can be displayed by the image forming apparatus can be related to one another through layers. In accordance with the present invention, the user interface unit 110 may display a plurality of user interfaces included in a single layer, or emply display screen layers (i.e., display a plurality of user interfaces that relate, for example, to different MFP functions) using a plurality of layers.

By way of an example of functional screen layers, the user interface unit 110 may display a user interface included in a first layer that is the uppermost layer along with a user interface included in a fourth layer on one screen. This is different from a conventional case in which user interfaces included in first, second, and third layers have to be sequentially displayed before the user interface included in the fourth layer is displayed.

If a plurality of user interfaces are displayed on a single screen, one or more data processing functions are configured through the displayed user interfaces. For example, the user interface unit 110 may display on a single screen all of the user interfaces for configuring printing-related functions, faxing-related functions, and scanning-related functions.

The user interface unit 110 displays the plurality of user interfaces on a single screen based on screen layout information, which is preferably pre-configured. The screen layout information includes information regarding the plurality of user interfaces to be displayed on the single screen. Preferably, the most frequently accessed user interfaces are displayed on a single screen. The predetermined screen layout information may be modified (e.g., dynamically adapted to display the user interface determined by the interface information storage unit 130 or other processing device to be the most frequently used interfaces by users of the image forming apparatus).

If too many user interfaces have to be displayed at the same time, they may not all be able to be displayed on a single screen. In this case, the afore-mentioned display screen layers are used in accordance with the present invention, wherein only some of the user interfaces are displayed on the single screen. The user can view all of the plurality of user interfaces by operating, for example, arrow keys (up/down/left/right) included in the image forming apparatus to change the layers of some of the user interfaces displayed on the single screen. Accordingly, the user interface unit 110 can display the plurality of user interfaces on a single screen by modifying the layers according to key operations.

The screen layout information storage unit 120 stores the predetermined screen layout information. For example, the predetermined screen layout information can comprise identifiers for each screen and relational data to relate screens with other screens based on MFP apparatus function for order of display purposes based on user inputs and navigation commands, or for display purposes on a single screen in accordance with the present invention (e.g., a list of the identifiers of user interfaces that are most frequently used whereby the list is modified as the users' preferences for the user interfaces changes). The interface information storage unit 130 stores interface information regarding the content of all user interfaces that can be displayed by the user interface unit 110.

The searching unit 140 searches for interface information corresponding to the screen layout information, and the user interface unit 110 displays a user interface based on the interface information found by the searching unit, thereby displaying the plurality of user interfaces on a single screen as described above.

Meanwhile, the user interface unit 110 may not only function as a display unit, but may also function as a data input unit to receive various types of data through a touch screen, for example. The input data is indicated by IN1 in FIG. 1.

When the user interface unit 110 functions as a data input unit, a single user interface is selected among the plurality of user interfaces displayed on the single screen, and items to be configured through the selected user interface are determined by user operations on the touch-screen.

Figure 2:
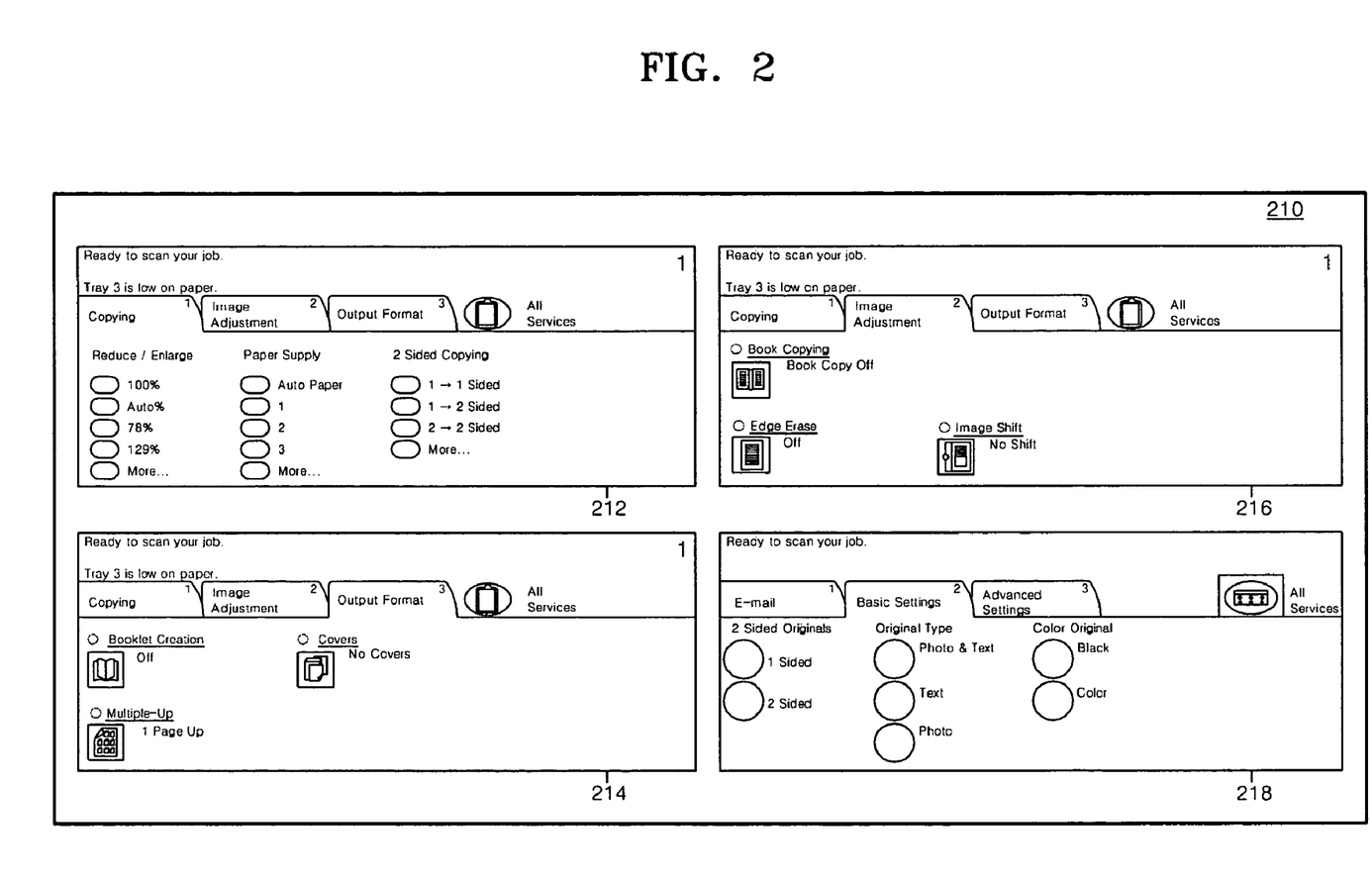
FIG. 2 illustrates examples of screens displayed through the user interface unit 110 of the image forming apparatus of FIG. 1.

FIG. 2 illustrates an example of screens displayed through the user interface unit 110 of the image forming apparatus of FIG. 1. FIG. 1 will be described in detail with reference to FIG. 2.

For the purposes of the following description, it will be assumed that the data processing functions that can be performed by the image forming apparatus include a printing function, a faxing function, and a scanning function. The present invention is not limited to these particular functions, however. Further, it will be assumed that the user interface displayed through the user interface unit 110 is a user interface for configuring printing, faxing, or scanning-related functions.

Among user interfaces to configure the print-related function, a user interface included in a first layer, that is, the uppermost layer, displays items related to overall printing functions, such as an item for determining pages to be printed, an item for determining a printing resolution, and an item for determining color printing. In this exemplary embodiment, the item for determining pages to be printed determines the number of copies of the same print data to print. The item for determining printing resolution determines printing resolution. The item for determining color printing determines whether to perform color printing or black-and-white printing.

In this exemplary embodiment, among user interfaces for configuring printing-related functions, a user interface included in a second layer may display a detailed item for determining pages to be printed, a detailed item for determining printing resolution, or a detailed item for determining color printing.

The screen layout information includes information regarding a plurality of screens to be displayed on the single screen. For example, FIG. 2 illustrates a single screen 210 which includes a user interface 212 which is included in a first layer and indicates items related to an overall printing function, a user interface 218 which is included in a second layer and indicates items for determining printing resolution, a user interface 214 which is included in the first layer and indicates items related to an overall faxing function, and a user interface 216 which is included in the first layer and indicates items related to an overall scanning function.

Figure 4:
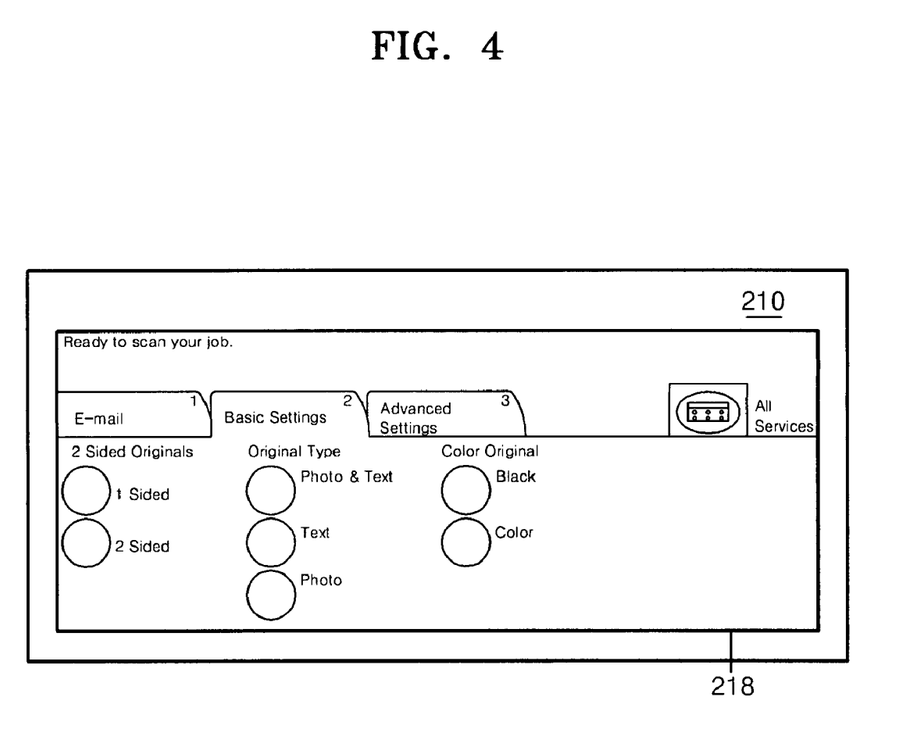
FIG. 4 is a view of a display unit with a selected user interface displayed.

In this exemplary embodiment, the screen layout information indicates that the plurality of user interfaces to be displayed on the single screen 210 corresponds to the aforementioned user interfaces 212, 218, 214, and 216. When the user interfaces 212, 218, 214, and 216 are all displayed on the single screen 210, and the user selects the user interface 218 through a touch operation to more accurately configure printing resolution, the user interface unit 218 displays the selected user interface 218 on the full screen, as shown in FIG. 4. Thereafter, the user can configure the printing resolution more accurately while viewing the selected user interface 218 displayed on the full screen.

Figure 5:
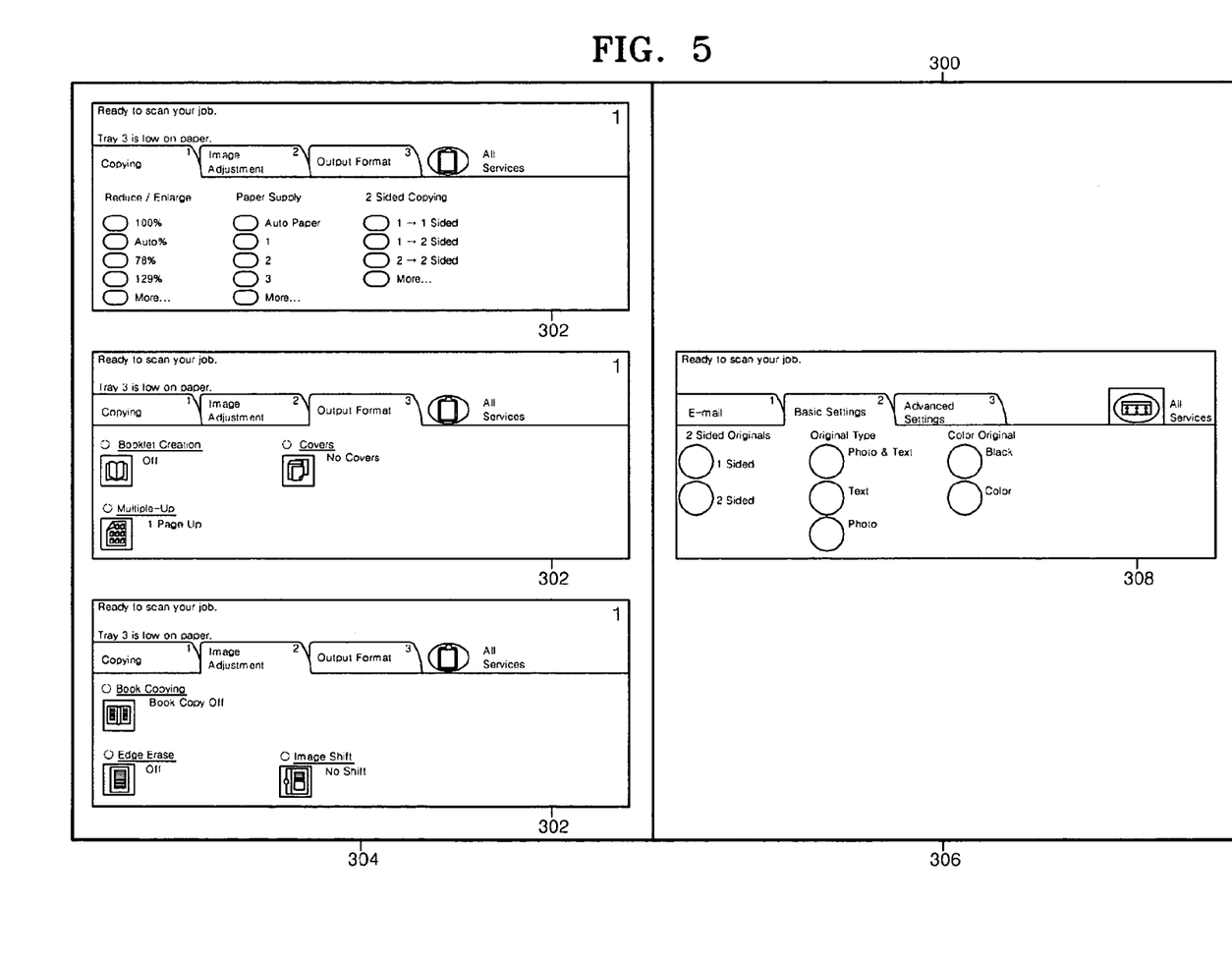
FIG. 5 is a view of a display unit with two regions for displaying user interfaces.

The layout of the screen 300 in FIG. 5 may be configured in accordance with an exemplary embodiment of the present invention so that the plurality of user interfaces 302 are displayed in a first region 304 and the selected user interface 306 is displayed in a separate, second region 308 on the same screen, as seen in FIG. 4.

Figure 3:
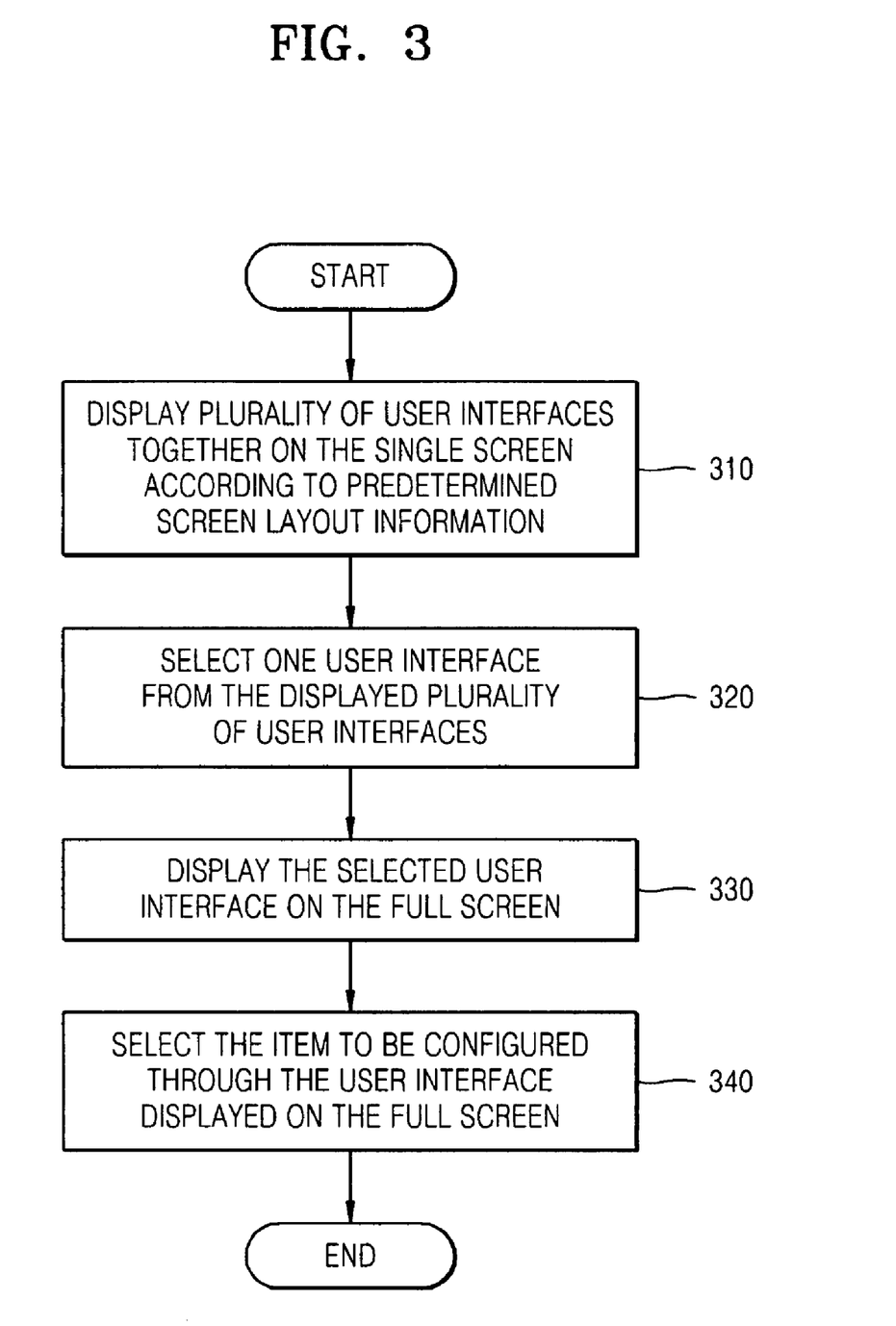
FIG. 3 is a flowchart of a method of displaying a user interface used in the image forming apparatus having a display function, according to an exemplary embodiment of the present invention.

FIG. 3 is a flowchart of a method of displaying a user interface used in the image forming apparatus having a display function, according to an exemplary embodiment of the present invention.

The image forming apparatus, which has a number of data processing functions and a display function, displays on a single screen a plurality of user interfaces that indicate one or more data processing functions and are included in one or more layers through operations 310 to 340.

The user interface unit 110 displays the plurality of user interfaces together on the single screen according to screen layout information (operation 310). Accordingly, the plurality of user interfaces displayed together form the single screen.

After operation 310, the user interface unit 110 selects a user interface from the plurality of user interfaces displayed in operation 310 (operation 320), and displays the user interface selected in operation 320 in a distinctive manner and the other user interfaces not selected in operation 320 (operation 330) are de-emphasized. To do this, in operation 330, the user interface selected in operation 320 can be enlarged more than other user interfaces not selected in operation 320, or the selected user interface can be displayed in a distinctive position with respect to all of the other user interfaces not selected in operation 320. Other methods of displaying the selected user interface will be apparent to those skilled in the relevant art.

After operation 330, an item to be configured through the user interface selected in operation 340 is selected by the user interface 110.

Accordingly, in an image forming apparatus that has a display function and a method for displaying a user interface, the image forming apparatus (which has a number of data processing functions and a display function) can display on a single screen a plurality of user interfaces which indicate one or more data processing functions and are included in one or more layers. Therefore, since the desired user interface is adjusted properly in accordance with the present invention (e.g., to display the user interfaces that are most frequently used including selected, plural main MFP apparatus function screens and/or selected, embedded layer screens), the user does not need to perform an inconvenient amount of key operations to view the desired user interface, thereby enhancing a user's convenience.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of displaying a user interface in an image forming apparatus capable of displaying user interfaces on a display unit, comprising:
   (a) simultaneously displaying a plurality of user interfaces, which are included in one or more layers together on a display unit;
   (b) selecting one user interface from the plurality of user interfaces;
   (c) configuring one or more functions displayed on the selected user interface; and
   (d) performing the configured function;
   wherein the layers comprise functional screen layers or display screen layers; and
   wherein the one or more functions comprises one or more functions selected from the group comprising a printing function, a copying function, a faxing function, a scanning function, and a data sending/receiving function.

2. The method of displaying a user interface of claim 1, further comprising enlarging and displaying the selected user interface.

3. The method of displaying a user interface of claim 1, wherein at least one of the plurality of user interfaces in step (a) is in a first layer and comprises user options, each user option having a corresponding user interface for display in a different layer wherever that user option is selected.

4. The method of displaying a user interface of claim 3, wherein steps (b) and (c) are performed whenever a layer of a user interface displayed in step (a) is modified.

5. The method of displaying a user interface of claim 1, wherein the plurality of user interfaces correspond to main screens in an uppermost layer of respective functions in the image forming apparatus, and wherein at least one of the main screens comprises user options, each user option having a corresponding user interface for display in a different layer wherever that user option is selected.

6. The method of displaying a user interface of claim 5, wherein, when a function displayed on a user interface included in a lowermost layer is configured, the configured function is performed.

7. The method of displaying a user interface of claim 1, wherein the number of user interfaces displayed together in step (a) is variable.

8. The method of displaying a user interface of claim 1, wherein, in step (a), if all of the plurality of user interfaces are not displayed on a single screen, the user interface displayed on the single screen is changed through a key operation for a user to observe all of the plurality of user interfaces.

9. The method of displaying a user interface of claim 1, wherein the selected user interface is displayed in a visually distinctive manner with respect to other, unselected user interfaces.

10. The method of displaying a user interface of claim 1, wherein the display unit comprises an operation panel of an image forming apparatus.

11. The method of displaying a user interface of claim 1, wherein the plurality of user interfaces are displayed on a first region of the display unit, and the selected user interface is displayed on a second region of the display unit.

12. A method of displaying a user interface on a display unit, comprising:
    (a) simultaneously displaying a plurality of user interfaces, which are included in one or more layers together on a display unit;
    (b) receiving a selection of one user interface from the plurality of user interfaces;
    (c) displaying the selected one user interface in a visually distinctive manner; and
    (d) receiving configuration information for one or more functions displayed on the selected one user interface;
    wherein the layers comprise functional screen layers or display screen layers; and
    wherein the one or more functions comprises one or more functions selected from the group comprising a printing function, a copying function, a faxing function, a scanning function, and a data sending/receiving function.

13. The method of displaying a user interface of claim 12, wherein the step of displaying the selected one user interface in a visually distinctive manner comprises displaying the selected user interface in an enlarged state.

14. The method of displaying a user interface of claim 12, wherein the number of user interfaces displayed simultaneously in step (a) is variable.

15. The method of displaying a user interface of claim 12, further comprising receiving an input from a user to observe additional user interfaces that are not displayed on the display unit.

16. The method of displaying a user interface of claim 12, wherein the plurality of user interfaces are displayed on a first region of the display unit, and the selected user interface is displayed on a second region of the display unit.

17. An image forming apparatus, comprising:
   an interface information storage unit for storing interface information regarding user interfaces displayed by the image forming apparatus;
   a screen layout information storage unit for storing screen layout information;
   a searching unit for searching for interface information corresponding to screen layout information; and
   a user interface unit for displaying a plurality of user interfaces based on interface information found by the searching unit, wherein the plurality of user interfaces are displayed simultaneously;
   wherein the plurality of user interfaces represents one or more data processing functions that can be performed by the image forming apparatus; and
   wherein the one or more data processing functions comprises one or more functions selected from the group comprising a printing function, a copying function, a faxing function, a scanning function, and a data sending/receiving function.

18. The image forming apparatus of claim 17, wherein the user interface unit comprises an LCD touch-screen for receiving selection information for selecting one user interface from among the plurality of displayed user interfaces.

19. The image forming apparatus of claim 18, wherein the user interface unit displays the selected one user interface in a visually distinctive manner.

20. An image forming apparatus, comprising:
   a searching unit that searches for interface information corresponding to predetermined screen layout information from among interface information prepared in advance; and
   a user interface unit that displays a plurality of user interfaces indicated by the found interface information simultaneously;
   wherein the plurality of user interfaces are included in one or more layers;
   wherein the plurality of user interfaces represents one or more data processing functions that can be performed by the image forming apparatus; and
   wherein the one or more data processing functions comprises one or more functions selected from the group comprising a printing function, a copying function, a faxing function, a scanning function, and a data sending/receiving function.

21. The image forming apparatus of claim 20, wherein the plurality of user interfaces represent one or more data processing functions which can be performed by the image forming apparatus.

22. A method of displaying a user interface performed in an image forming apparatus capable of displaying a user interface, comprising:
   searching for interface information corresponding to predetermined screen layout information from among interface information prepared in advance; and
   displaying a plurality of user interfaces indicated by the found interface information simultaneously;
   wherein the plurality of user interfaces represents one or more data processing functions that can be performed by the image forming apparatus; and
   wherein the one or more data processing functions comprises one or more functions selected from the group comprising a printing function, a copying function, a faxing function, a scanning function, and a data sending/receiving function.

23. The image forming apparatus of claim 22, wherein the plurality of user interfaces are included in one or more layers.

* * * * *